(12) United States Patent
Wang

(10) Patent No.: US 10,114,490 B2
(45) Date of Patent: Oct. 30, 2018

(54) COLOR FILTER SUBSTRATE, METHOD OF MANUFACTURING THE SAME, TOUCH SCREEN AND DISPLAY DEVICE

(71) Applicants: BOE Technology Group Co., Ltd., Beijing (CN); Chengdu BOE Optoelectronics Technology Co., Ltd., Chengdu (CN)

(72) Inventor: Xi Wang, Beijing (CN)

(73) Assignees: BOE TECHNOLOGY GROUP CO., LTD., Beijing (CN); CHENGDU BOE OPTOELECTRONICS TECHNOLOGY CO., LTD., Chengdu (CN)

( * ) Notice: Subject to any disclaimer, the term of this patent is extended or adjusted under 35 U.S.C. 154(b) by 6 days.

(21) Appl. No.: 15/326,066

(22) PCT Filed: Feb. 29, 2016

(86) PCT No.: PCT/CN2016/074826
§ 371 (c)(1),
(2) Date: Jan. 13, 2017

(87) PCT Pub. No.: WO2016/155445
PCT Pub. Date: Oct. 6, 2016

(65) Prior Publication Data
US 2017/0205922 A1    Jul. 20, 2017

(30) Foreign Application Priority Data

Mar. 27, 2015    (CN) .......................... 2015 1 0142859

(51) Int. Cl.
*G06F 3/041* (2006.01)
*G02F 1/1335* (2006.01)
*G02F 1/1333* (2006.01)

(52) U.S. Cl.
CPC ........ *G06F 3/0412* (2013.01); *G02F 1/13338* (2013.01); *G02F 1/133512* (2013.01);
(Continued)

(58) Field of Classification Search
CPC ......... G06F 3/0412; G06F 2203/04107; G06F 2203/04103; G02F 1/133514; G02F 1/133512; G02F 1/133516; G02F 1/13338
See application file for complete search history.

(56) References Cited

U.S. PATENT DOCUMENTS 7,872,712 B2 *   1/2011  Kim ................... G02F 1/133555
                                                         349/113
9,571,097 B2 *   2/2017  Wang ................ H03K 17/9622
(Continued)

FOREIGN PATENT DOCUMENTS

CN         102967976 A      3/2013
CN         103309503 A      9/2013
(Continued)

OTHER PUBLICATIONS

International Search Report and Written Opinion of International Application No. PCT/CN2016/074826, dated May 25, 2016, 8 pages.
(Continued)

*Primary Examiner* — Erin M File
(74) *Attorney, Agent, or Firm* — Westman, Champlin & Koehler, P.A.

(57) ABSTRACT

The present disclosure provides a color filter substrate, a method of manufacturing the color filter substrate, a touch screen and a display device, and pertains to the technical field of touch screen. The color filter substrate includes a transparent substrate, and a touch screen panel pattern
(Continued)

provided on a side of the transparent substrate. A surface of the touch screen panel pattern is provided with a plurality of concave curved faces.

16 Claims, 5 Drawing Sheets

(52) U.S. Cl.
CPC .. *G02F 1/133514* (2013.01); *G02F 1/133516* (2013.01); *G06F 2203/04103* (2013.01); *G06F 2203/04107* (2013.01)

(56) References Cited

U.S. PATENT DOCUMENTS

| | | | | |
|---|---|---|---|---|
| 2004/0233139 | A1* | 11/2004 | Asano | G02B 5/201 345/76 |
| 2006/0036023 | A1* | 2/2006 | Kamata | C08K 5/3472 524/556 |
| 2006/0257761 | A1* | 11/2006 | Hasei | G02B 5/201 430/7 |
| 2010/0141877 | A1* | 6/2010 | Huang | B29D 11/00634 349/106 |
| 2011/0221698 | A1* | 9/2011 | Ku | G06F 3/044 345/174 |
| 2011/0248938 | A1* | 10/2011 | Kwak | G06F 3/044 345/173 |
| 2013/0286465 | A1* | 10/2013 | Chen | G02F 1/167 359/296 |
| 2014/0022498 | A1* | 1/2014 | Kim | G02F 1/134309 349/106 |
| 2014/0218630 | A1* | 8/2014 | Kang | G06F 3/044 349/12 |
| 2015/0021559 | A1* | 1/2015 | Han | H01L 51/524 257/40 |
| 2015/0060252 | A1 | 3/2015 | Wang et al. | |
| 2016/0085352 | A1* | 3/2016 | Kang | G06F 3/0412 345/174 |
| 2016/0103360 | A1* | 4/2016 | Wang | G02F 1/133514 349/12 |
| 2016/0139456 | A1* | 5/2016 | Hsiao | G02F 1/133504 349/61 |
| 2017/0017112 | A1* | 1/2017 | Ye | G02F 1/133514 |

FOREIGN PATENT DOCUMENTS

| | | |
|---|---|---|
| CN | 103426504 A | 12/2013 |
| CN | 103489504 A | 1/2014 |
| CN | 203520364 A | 4/2014 |
| CN | 104730757 A | 6/2015 |
| JP | 2013-142966 A | 7/2013 |

OTHER PUBLICATIONS

English translation of Box No. V of the Written Opinion for the International Searching Authority for International Application No. PCT/CN2016/074826, 2 pages.

First Office Action, including Search Report, for Chinese Patent Application No. 201510142859.0, dated Mar. 1, 2017, 10 pages.

\* cited by examiner

| forming a touch screen panel pattern on a side of a transparent substrate, a surface of the touch screen panel pattern being formed with a plurality of concave curved faces. | 401 |
|---|---|
| forming a color resist layer on the other side of the transparent substrate. | 402 |

US 10,114,490 B2

COLOR FILTER SUBSTRATE, METHOD OF MANUFACTURING THE SAME, TOUCH SCREEN AND DISPLAY DEVICE

CROSS-REFERENCE TO RELATED APPLICATION

This application is a national stage application of an international patent application PCT/CN2016/074826, filed Feb. 29, 2016, entitled "COLOR FILTER SUBSTRATE, METHOD OF MANUFACTURING THE SAME, TOUCH SCREEN AND DISPLAY DEVICE", which claims benefit of Chinese Patent Application No. 201510142859.0, filed with SIPO on Mar. 27, 2015 and entitled with "COLOR FILTER SUBSTRATE, METHOD OF MANUFACTURING THE SAME, TOUCH SCREEN AND DISPLAY DEVICE", which is incorporated herein by reference in its entirety.

BACKGROUND OF THE DISCLOSURE

Field of the Disclosure

The present disclosure generally relates to the technical field of touch screen, in particular, to a color filter substrate, a method of manufacturing the color filter substrate, a touch screen and a display device.

Description of the Related Art

A touch screen, as an intelligentialized human-computer interaction interface product, is widely used in industrial production and our daily life. A user can control the touch screen to display desired images by touching the touch screen.

In the prior art, a touch screen is disposed in a display device. The touch screen includes an array substrate, a color filter substrate, and liquid crystal filled between the array substrate and the color filter substrate. A lower polarizer is provided on a backlight side of the array substrate, and an upper polarizer is provided on a display side of the color filter substrate. The display device is further provided therein with a backlight source. A light emitted from the backlight source can sequentially pass through the lower polarizer, the array substrate, the liquid crystal, the color filter substrate and the upper polarizer of the touch screen to brighten the touch screen, thereby displaying images. The color filter substrate includes a transparent substrate, a touch screen panel (TSP) pattern formed on a side of the transparent substrate, and a color resist layer formed on the other side of the transparent substrate. The TSP pattern includes TSP wires. An upper surface and side surfaces of each TSP wire are planar and are not in a same plane.

When the light emitted from the backlight source passes through the TSP wires on the color filter substrate, refractions of the light emitted from the backlight source on a portion of the color filter substrate where the TSP wires are provided and on other portions of the color filter substrate where no TSP wires are provided, are different. Further, when the light at the display side of the color filter substrate illuminates on the color filter substrate, the upper surfaces and the side surfaces of the TSP wires reflect the light in different directions. As a result, stripes are presented on the surface of the color filter substrate during displaying of images, causing adverse influence on display effect.

SUMMARY

Thus, the present disclosure provides a color substrate, a method of manufacturing the color substrate, a touch screen and a display device. Technical solutions are provided as follows.

In accordance with a first aspect, there is provided a color filter substrate, comprising:
a transparent substrate; and
a touch screen panel (TSP) pattern formed on a side of the transparent substrate, a surface of the TSP pattern being formed with a plurality of concave curved faces.

Optionally, the plurality of concave curved faces include first concave curved faces and second concave curved faces.

The TSP pattern includes a plurality of TSP wires, and an upper surface of each of the plurality of TSP wires is formed with a plurality of the first concave curved faces arranged in an array, and side surfaces of each of the plurality of TSP wires are formed with the second concave curved faces.

Optionally, an opening of the first concave curved face is in a circular shape.

Optionally, the color filter substrate further includes a color resist layer provided on the other side of the transparent substrate.

The color resist layer includes color pixels and black matrices disposed between each two adjacent color pixels.

In accordance with a second aspect, there is provided a method of manufacturing a color filter substrate, comprising the steps of:
forming a touch screen panel pattern on a side of a transparent substrate, a surface of the touch screen panel pattern being formed with a plurality of concave curved faces.

Optionally, the plurality of concave curved faces include first concave curved faces and second concave curved faces.

The step of forming a touch screen panel pattern on a side of a transparent substrate includes:
forming an Indium Tin Oxide (ITO) thin film on the side of the transparent substrate;
forming an ITO pattern including the first concave curved faces arranged in an array by a first patterning process;
forming the TSP pattern including a plurality of TSP wires by a second patterning process, an upper surface of each of the plurality of TSP wires being formed with a plurality of the first concave curved faces arranged in an array, and side surfaces of each of the plurality of TSP wires being formed with the second concave curved faces.

Optionally, a photoresist used in in the first patterning process and a photoresist used in the second patterning process both are negative.

Optionally, an opening of the first concave curved face is in a circle shape. In a case that a thickness of the ITO thin film is in a range of 1000-3000 Å, a diameter of the circle is in a range of 200-600 Å, and a maximum depth of the first concave curved face is in a range of 100-300 Å.

Optionally, the method of manufacturing the color filter substrate further includes:
forming a color resist layer on the other side of the transparent substrate, the color resist layer including color pixels and black matrices disposed between each two adjacent color pixels.

In accordance with a third aspect, there is provided a touch screen, comprising the color filter substrate according to the first aspect.

In accordance with a fourth aspect, there is provided a display device, comprising the touch screen according to the third aspect.

It should be understood that the above general description and detailed description provided hereafter are only exemplary and explanatory and should not limit the present disclosure.

BRIEF DESCRIPTION OF THE DRAWINGS

In order to explain technical solutions of embodiments of the present application more clearly, the drawings that are used to illustrate the embodiments will below be described briefly. Apparently, the drawings described below only show some of embodiments of the present application. One skilled in the art may derive other figures based on these figures without paying any inventive efforts.

The above drawings show specific embodiments of the present disclosure that will be described below in details. These figures and description are intended to explain the inventive concept of the present disclosure with reference to the specific embodiments for one skilled in the art, instead of limiting the scope or spirit of the present disclosure by any way.

DETAILED DESCRIPTION OF EMBODIMENTS

In order to enable objectives, technical solutions and advantages of the present disclosure to become more clear, the implementations of the embodiments of the present disclosure are described in detail in conjunction with the drawings attached herein.

Figure 1:
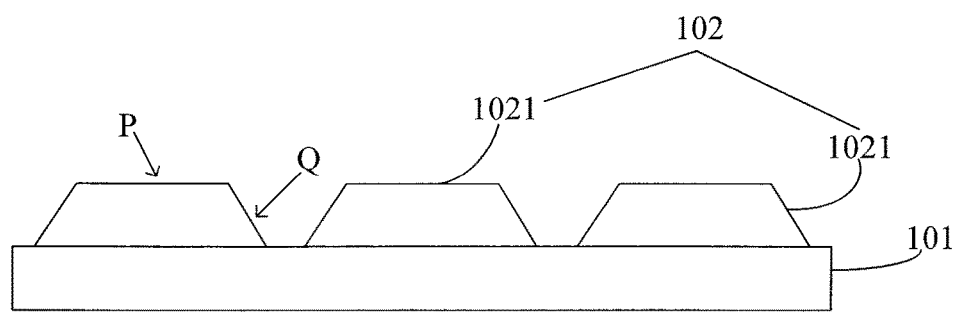
FIG. 1 is a schematic view of a structure of a color filter substrate.

FIG. 1 is a schematic view of a structure of a color filter substrate 10. As shown in FIG. 1, the color filter substrate 10 may include a transparent substrate 101 and a touch screen panel (TSP) pattern 102 provided on a side of the transparent substrate 101. The TSP pattern 102 may include TSP wires 1021. With reference to FIG. 1, upper surfaces P and side surfaces Q of the TSP wires 1021 are planar, and the upper surfaces P and the side surfaces Q are not in a same plane. When a light is emitted to a display side of the color filter substrate 10 from a backlight side of the color filter substrate 10, the light is refracted as it passes through the transparent substrate 101 and the TSP wires 1021. Since a thickness of a portion of the transparent substrate 101 on which the TSP wires 1021 are provided and a thickness of other portions of the transparent substrate 101 on which no TSP wires 1021 are provided are different from each other, refractions of the light on those portions are different. As a result, stripes are presented on a surface of the color filter substrate 10. When the light at the display side of the color filter substrate 10 impinges on the color filter substrate 10, the TSP wires 1021 reflects the light. Since the upper surface P and the side surfaces Q of the TSP wire 1021 are not in the same plane, the light runs along different reflective directions after the light has been reflected by the upper surface P and the side surfaces Q of the TSP wire 1021. Therefore, a larger difference between reflection of the light on the upper surface P of the TSP wire and reflection of the light on the side surfaces Q of the TSP wire occur, causing stripes present on the surface of the color filter substrate 10.

Figure 2:
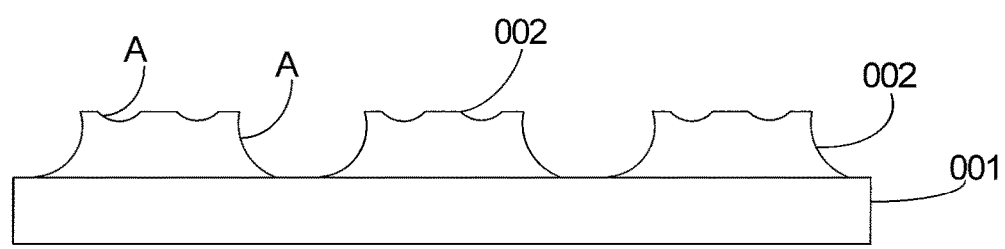
FIG. 2 is a schematic view of a structure of a color filter substrate according to an embodiment of the present disclosure.

As shown in FIG. 2, the embodiment of the present disclosure provides another color filter substrate 00. This color filter substrate 00 may include a transparent substrate 001 and a touch screen panel pattern 002 provided on a side of the transparent substrate 001. A surface of the TSP pattern is formed with a plurality of concave curved faces A.

As described above, with the color filter substrate according to the embodiment of the present disclosure, since the surface of the TSP pattern provided on the side of the transparent substrate of the color filter substrate is formed with the plurality of concave curved faces, when a light emitted from a backlight source passes through the TSP pattern on the color filter substrate, the plurality of concave curved faces can refract the light towards different directions, such that an intensity of the light after passing through the TSP pattern may be weakened, and difference between refraction of the light emitted from the backlight source on the portion of the color filter substrate where the TSP pattern is provided and refraction of the light emitted from the backlight source on the portion of the color filter substrate where no TSP pattern is provided can be reduced. Furthermore, when the light impinges on the display side of the color filter substrate, the plurality of concave curved faces can scatter the light towards different directions, such that the intensity of the light which has been reflected by the color filter substrate may be weakened, and thus a possibility of the presence of stripes on the surface of the color filter substrate during displaying of images may be reduced and displaying effects may be improved.

Figures 3, 4:
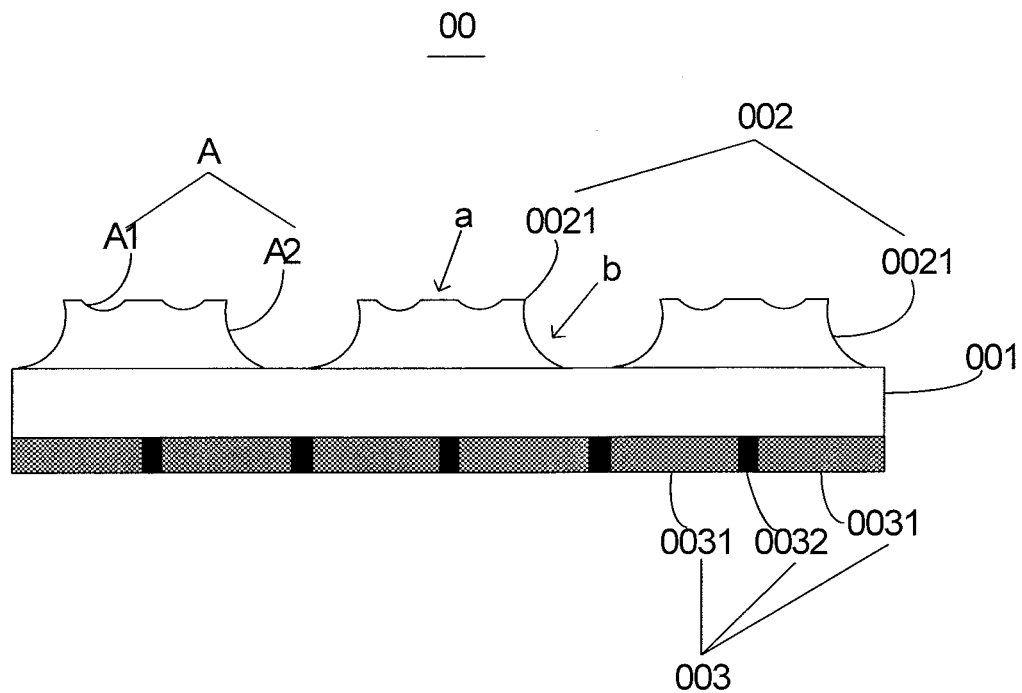
FIG. 3 is a schematic view of a structure of a color filter substrate according to another embodiment of the present disclosure.
FIG. 4 is a flowchart of a method of manufacturing a color filter substrate according to an embodiment of the present disclosure.

As shown in FIG. 3, the embodiment of the present disclosure also provides a further color filter substrate 00. This color filter substrate 00 may include a transparent substrate 001 and a touch screen panel (TSP) pattern 002 provided on a side of the transparent substrate 001. A surface of the TSP pattern is formed with a plurality of concave curved faces A. In the color filter substrate 00, the TSP pattern 002 may include a plurality of TSP wires 0021, and the plurality of concave curved faces A may include a plurality of first concave curved faces A1 and a plurality of second concave curved faces A2. An upper surface a of each of the plurality of TSP wires 0021 is formed with the plurality of first concave curved faces A1 arranged in an array, side surfaces b of each TSP wire are formed with the plurality of second concave curved faces A2. In an exemplary embodiment, a material for the TSP wires is Indium Tin Oxide (ITO). The present color filter substrate 00 is made by single ITO layer technique, and an ITO layer in which the TSP wires lie may be regarded as a single ITO layer in the single ITO layer technique.

Since the plurality of first concave curved faces A1 on the upper surface a of the TSP wire 0021 are arranged in the array, that is, the plurality of first concave curved faces A1 are evenly arranged on the upper surface a of the TSP wire 0021, difference between the case in which the upper surface a of the TSP wire 0021 is formed with the first concave curved faces A1 and the prior art in which there is no first concave curved face A1 on the upper surface a of the TSP wire 0021 is reduced. Furthermore, since the side surfaces b of the TSP wire 0021 are formed with the second concave curved faces A2, when a light emitted from a backlight source passes through the color filter substrate 00, the plurality of concave curved faces A on the upper surface a and the side surfaces b of the TSP wire 0021 can refract the light towards different directions, such that an intensity of the light after passing through the upper surface a and the side surfaces b of the TSP wire 0021 may be weakened as compared to the prior art, and difference between refraction of the light emitted from the backlight source on the portion of the color filter substrate 00 where the TSP pattern is provided and refraction of the light emitted from the backlight source on the portion of the color filter substrate 00 where no TSP pattern is provided can be reduced. Furthermore, difference in appearance between the portion of the color filter substrate 00 where the TSP pattern is provided and the portion of the color filter substrate 00 where no TSP pattern is provided can be reduced. Further, when the light impinges on the upper surface a and the side surfaces b of the TSP wire, the plurality of concave curved faces A can scatter the light, such that difference in appearance between the portion of the color filter substrate 00 where the TSP pattern is provided and the portion of the color filter substrate 00 where no TSP pattern is provided can be further reduced, and stripes present on the color filter substrate may be reduced.

In an embodiment, an opening of the first concave curved face A1 may be in a circle shape. The circular opening may enable the plurality of first concave curved faces A1 arranged in an array to be distributed on the upper surface a of the TSP wire 0021 more evenly, so that difference between the case in which the upper surface a of the TSP wire 0021 is formed with the first concave curved faces A1 and the prior art in which there is no first concave curved face A1 on the upper surface a of the TSP wire 0021 may be further reduced. It should be noted that the opening of the first concave curved face A1 may be in an ellipse shape. The embodiments of the present disclosure do not limit the shape of the opening.

As shown in FIG. 3, the color filter substrate 00 may further include a color resist layer 003 provided on the other side of the transparent substrate 001. The color resist layer 003 may include color pixels 0031 and black matrices 0032 disposed between each two adjacent color pixels 0031. The details of the structure of the color resist layer 003 may be found in the prior art, and the detailed description of the structure of the color resist layer is omitted in the embodiments of the present disclosure.

In an exemplary embodiment, the color filter substrate 00 according to the embodiment of the present disclosure may be applied in a touch screen which is made by forming an ITO conductive film and a sensor directly on a protection glass, or a touch screen which is made by forming an TIO conductive film and a sensor on a liquid crystal panel and providing touch sensors on the liquid crystal panel.

With the color filter substrate according to the embodiment of the present disclosure, since the surface of the TSP pattern provided on a side of the transparent substrate of the color filter substrate is formed with the plurality of concave curved faces, when a light emitted from a backlight source passes through the TSP pattern on the color filter substrate, the plurality of concave curved faces can refract the light towards different directions, such that an intensity of the light after passing through the TSP pattern may be weakened, and difference between refraction of the light emitted from the backlight source on the portion of the color filter substrate where the TSP pattern is provided and refraction of the light emitted from the backlight source on the portion of the color filter substrate where no TSP pattern is provided can be reduced. Furthermore, when the light impinges on the display side of the color filter substrate, the plurality of concave curved faces can scatter the light towards different directions, such that the intensity of the light which has been reflected by the color filter substrate may be weakened, and thus a possibility of the presence of stripes on the surface of the color filter substrate during displaying of images may be reduced and displaying effects may be improved.

The embodiment of the present disclosure also provides a method of manufacturing a color filter substrate. The method of manufacturing the color filter substrate may include:

forming a touch screen panel(TSP) pattern on a side of a transparent substrate, a surface of the touch screen panel pattern being formed with a plurality of concave curved faces.

With the method of manufacturing the color filter substrate according to the embodiment of the present disclosure, since the surface of the TSP pattern provided on a side of the transparent substrate of the color filter substrate is formed with the plurality of concave curved faces, when a light emitted from a backlight source passes through the TSP pattern on the color filter substrate, the plurality of concave curved faces can refract the light towards different directions, such that an intensity of the light after passing through the TSP pattern may be weakened, and difference between refraction of the light emitted from the backlight source on the portion of the color filter substrate where the TSP pattern is provided and refraction of the light emitted from the backlight source on the portion of the color filter substrate where no TSP pattern is provided can be reduced. Furthermore, when the light impinges on the display side of the color filter substrate, the plurality of concave curved faces can scatter the light towards different directions, such that the intensity of the light which has been reflected by the color filter substrate may be weakened, and stripes present on the surface of the color filter substrate during displaying of images may be reduced and displaying effects may be improved.

In a specific embodiment, the step of forming a touch screen panel pattern, a surface of which is formed with a plurality of concave curved faces, on a side of a transparent substrate may include forming an Indium Tin Oxide (ITO) thin film on the side of the transparent substrate, forming an ITO pattern including the first concave curved faces arranged in an array by a first patterning process, and forming the TSP pattern including a plurality of TSP wires by a second patterning process. Finally, an upper surface of each of the plurality of TSP wires is formed with the first concave curved faces arranged in the array, and side surfaces of each of the plurality of TSP wires are formed with the second concave curved faces.

In an exemplary embodiment, a photoresist used in in the first patterning process and a photoresist used in the second patterning process both are negative. An opening of the first concave curved face may be in a circle shape. In a case that a thickness of the ITO thin film is in a range of 1000-3000 Å, a diameter of the circle is in a range of 200-600 Å, and a maximum depth of the first concave curved face is in a range of 100-300 Å.

Further, the method of manufacturing the color filter substrate may further include forming a color resist layer on the other side of the transparent substrate. The color resist layer includes color pixels and black matrix disposed between each two adjacent color pixels With the method of manufacturing the color filter substrate according to the embodiments of the present disclosure, since the surface of the TSP pattern provided on a side of the transparent substrate of the color filter substrate is formed with the plurality of concave curved faces, when a light emitted from a backlight source passes through the TSP pattern on the color filter substrate, the plurality of concave curved faces can refract the light towards different directions, such that an intensity of the light after passing through the TSP pattern may be weakened, and difference between refraction of the light emitted from the backlight source on the portion of the color filter substrate where the TSP pattern is provided and refraction of the light emitted from the backlight source on the portion of the color filter substrate where no TSP pattern is provided can be reduced. Furthermore, when the light impinges on the display side of the color filter substrate, the plurality of concave curved faces can scatter the light towards different directions, such that the intensity of the light which has been reflected by the color filter substrate may be weakened, and stripes present on the surface of the color filter substrate during displaying of images may be reduced and displaying effects may be improved.

The embodiment of the present disclosure also provides a method of manufacturing a further color filter substrate, as shown in FIG. 4. The method of manufacturing a further color filter substrate includes:

step 401, forming a touch screen panel pattern on a side of a transparent substrate, a surface of the touch screen panel pattern being formed with a plurality of concave curved faces.

In a specific embodiment, the plurality of concave curved faces may include first concave curved faces and second concave curved faces.

Figure 5:
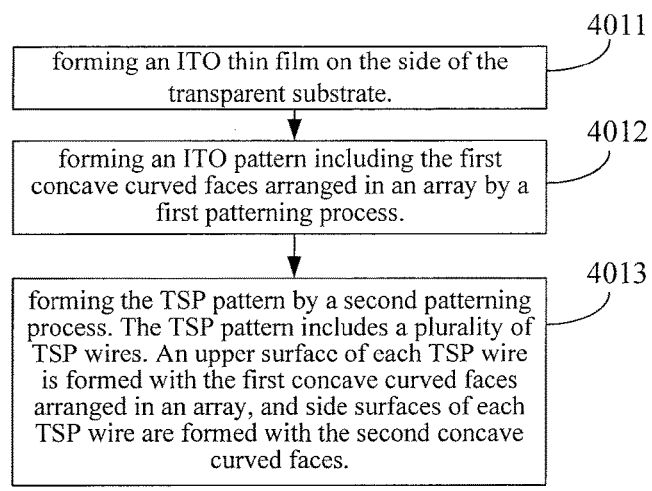
FIG. 5 is a flowchart of a method of forming a TSP pattern according to an embodiment of the present disclosure.

As shown in FIG. 5, step 401 may include:

Step 4011, forming an ITO thin film on the side of the transparent substrate.

Figure 6:
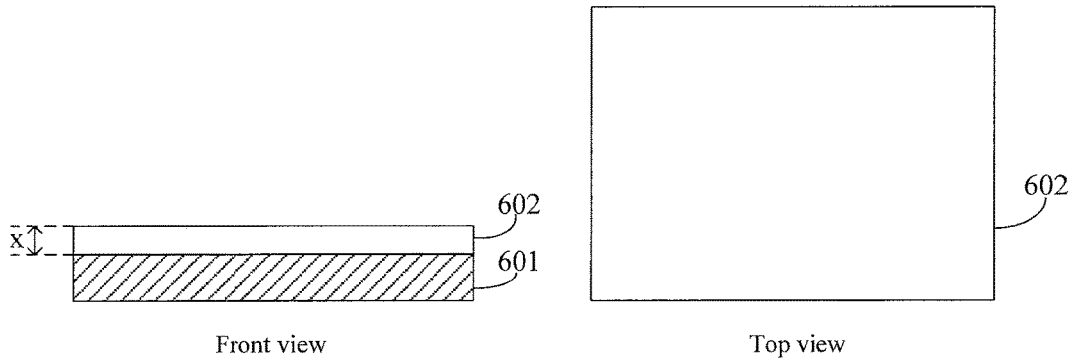
FIG. 6 is a schematic view of a structure of a transparent substrate according to an embodiment of the present disclosure.

In a specific embodiment, the ITO thin film may be formed on the transparent substrate by sputtering. In practical application, the ITO thin film may be formed on the transparent substrate by depositing or coating. The embodiment of the present disclosure does not limit processes of forming the ITO thin film on the transparent substrate. FIG. 6 shows a front view and a top view of a transparent substrate 601 made based on step 4011 according to the embodiment of the present disclosure. The ITO thin film 602 is formed on a side of the transparent substrate 601. Since a surface of the transparent substrate 601 is flat, a surface of the ITO thin film 602 formed the side of the transparent substrate 601 is also flat. In an exemplary embodiment, a thickness x of the ITO thin film 602 may be in a range of 1000-3000 Å.

Step 4012, forming an ITO pattern including the first concave curved faces arranged in an array by a first patterning process.

Figure 7:
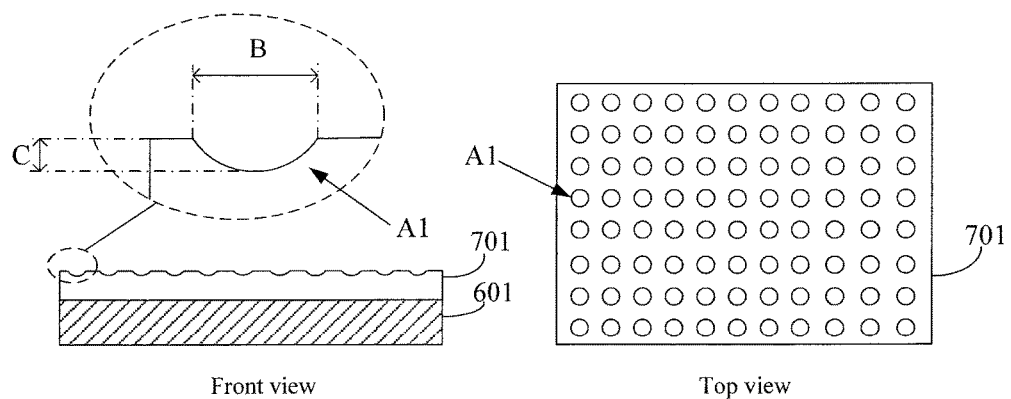
FIG. 7 is a schematic view of a structure of a transparent substrate according to another embodiment of the present disclosure.

In an exemplary embodiment, the ITO thin film formed in step 4011 may be processed by the first patterning process, such as being coated with a photoresist, being exposed to light using a mask, being developed with a developer, being etched with an etchant, peeling off the photoresist, etc., so as to form the ITO pattern including the first concave curved faces arranged in an array. An opening of the first concave curved face may be in a circle shape. As shown, FIG. 7 shows a front view and a top view of the transparent substrate 601 formed after the first patterning process. The ITO pattern 701 is formed on a side of the transparent substrate 601, and includes the first concave curved faces A1 arranged in an array. Both of a diameter B of the opening of the first concave curved face A1 and a maximum depth C of the first concave curved face A1 are related with the thickness of the ITO thin film formed in step 4011. In an exemplary embodiment, when the thickness of the ITO thin film formed in step 4011 is in a range of 1000-3000 Å, the diameter B of the opening of the first concave curved face A1 may be in a range of 200-600 Å, and the maximum depth C of the first concave curved face A1 may be in a range of 100-300 Å. The first concave curved faces A1 are evenly distributed on the ITO thin film to become in a form of an array.

It should be noted that the photoresist used in the first patterning process is a negative photoresist. The mask used in the first patterning process may be a mask, a surface of which is provided with a plurality of circular holes arranged in an array, and the first concave curved faces arranged in an array and having openings in a circle shape may be formed on the surface of the ITO thin film by controlling parameters, such as time duration and temperature, required for etching during etching with the etchant. The opening of the first concave curved face may be in a circle shape, so that the first concave curved faces arranged in an array may be evenly distributed on the surface of the ITO thin film to reduce the difference between the case in which the surface of the ITO thin film is formed with the first concave curved faces and the prior art in which there is no first concave curved face on the surface of the ITO thin film. In an exemplary embodiment, the mask used in the first patterning process may be a mask a surface of which is provided with a plurality of elliptical through holes arranged in an array. The embodiment of the present disclosure does not limit the shape of the opening. In a case that the mask has a surface provided with a plurality of elliptical through holes arranged in an array, the opening of the first concave curved face formed after the first patterning process is elliptical.

Step 4013, forming the TSP pattern by a second patterning process. The TSP pattern includes a plurality of TSP wires. An upper surface of each TSP wire is formed with the first concave curved faces arranged in an array, and side surfaces of each TSP wire are formed with the second concave curved faces.

Figure 8:
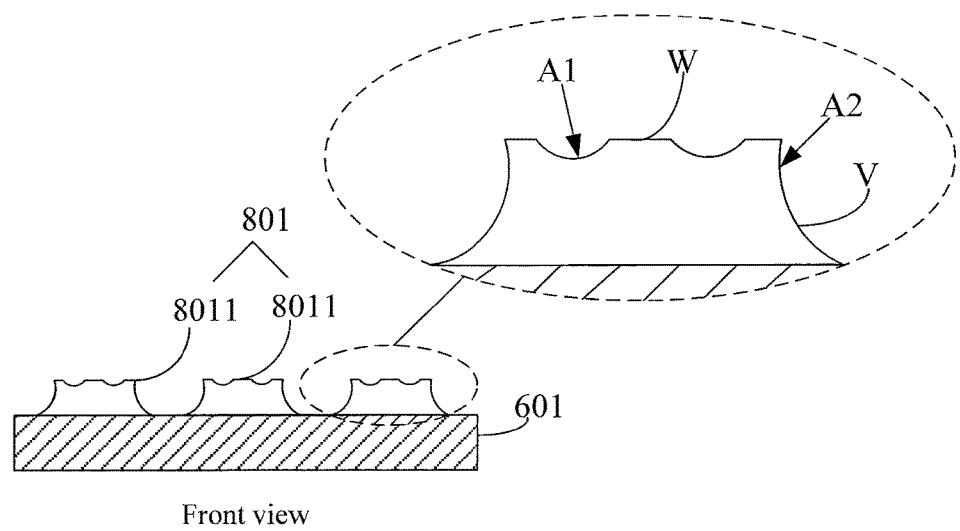
FIG. 8 is a schematic view of a structure of a transparent substrate according to a further embodiment of the present disclosure.

In an exemplary embodiment, the ITO pattern formed in step 4012 and including the first concave curved faces arranged in an array may be processed by the second patterning process, such as being coated with a photoresist, being exposed to light using a mask, being developed with a developer, being etched with an etchant, peeling off the photoresist, etc., so as to form the TSP pattern. The TSP pattern may include the TSP wires. It should be noted that the photoresist used in the second patterning process is negative. The mask used in the second patterning process may be same as that used for forming the TSP pattern in the prior art, but time duration of etching used in the second patterning process is less than that used in the prior art during etching. FIG. 8 shows a front view of the transparent substrate 601 formed after having been processed by the second patterning process, in which the TSP pattern 801 is formed on the side of transparent substrate 601. As shown in FIG. 8, the TSP pattern 801 may include TSP wires 8011. An upper surface W of each TSP wire 8011 is formed with the first concave curved faces A1 arranged in an array, and side surfaces V of each TSP wire 8011 are formed with the second concave curved faces A2. The first concave curved faces A1 arranged in an array and formed on the upper surface W of the TSP wire 8011 are formed in step 4012.

Since the first concave curved faces A1 formed on the upper surface W of the TSP wire 8011 are arranged in an array, and the side surfaces V of the TSP wire 8011 are formed with the second concave curved faces A2, when a light emitted from a backlight source passes through the color filter substrate, the upper surfaces W and the side surfaces V of the TSP wires 8011 may refract the light towards different directions, such that an intensity of the light after passing through the upper surfaces and the side surfaces of the TSP wires 8011 may be weakened as compared to the prior art, and difference between refraction of the light emitted from the backlight source on the portion of the color filter substrate where the TSP pattern 801 is provided and refraction of the light emitted from the backlight source on the portion of the color filter substrate where no TSP pattern 801 is provided can be reduced. Furthermore, difference in appearance between the portion of the color filter substrate where the TSP pattern 801 is provided and the portion of the color filter substrate where no TSP pattern 801 is provided can be reduced. Further, when the light impinges on the upper surfaces W and side surfaces V of the TSP wires 8011, the plurality of concave curved faces A can scatter the light, such that difference in appearance between the portion of the color filter substrate where the TSP pattern 801 is provided and the portion of the color filter substrate where no TSP pattern 801 is provided can be further reduced, and stripes present on the surface of the color filter substrate may be reduced.

Step 402, forming a color resist layer on the other side of the transparent substrate.

Figure 9:
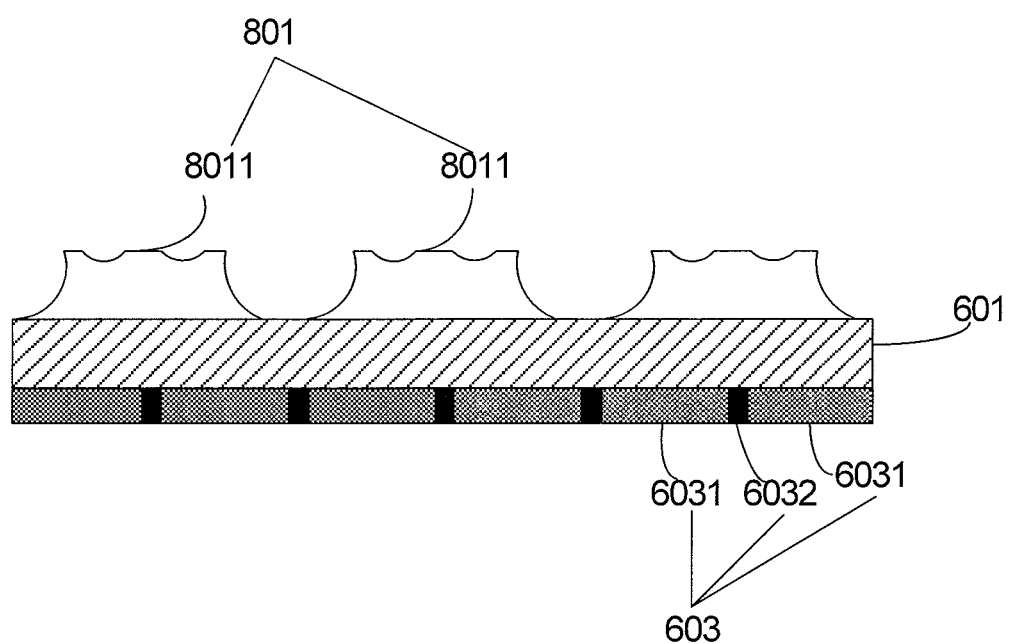
FIG. 9 is a schematic view of a structure of a color resist layer according to an embodiment of the present disclosure.

As shown in FIG. 9, the color resist layer 603 may include color pixels 6031 and black matrix 6032 disposed between each two adjacent color pixels 6031. The specific step of forming the color resist layer 603 on the other side of the transparent substrate 601 can be found in the prior art, and its detailed description is omitted in the embodiments of the present disclosure.

It should be noted that sequences of step 402 and step 401 may be interchanged. The embodiments of the present disclosure does not limit the sequence of step 402 and step 401.

With the method of manufacturing the color filter substrate according to the embodiment of the present disclosure, since the surface of the TSP pattern provided on a side of the transparent substrate of the color filter substrate is formed with the plurality of concave curved faces, when a light emitted from a backlight source passes through the TSP pattern on the color filter substrate, the plurality of concave curved faces can refract the light towards different directions, such that an intensity of the light after passing through the TSP pattern may be weakened, and difference between refraction of the light emitted from the backlight source on the portion of the color filter substrate where the TSP pattern is provided and refraction of the light emitted from the backlight source on the portion of the color filter substrate where no TSP pattern is provided can be reduced. Furthermore, when the light impinges on the display side of the color filter substrate, the plurality of concave curved faces can scatter the light towards different directions, such that the intensity of the light which has been reflected by the color filter substrate may be weakened, and stripes present on the surface of the color filter substrate during displaying of images may be reduced and displaying effects may be improved.

The embodiment of the present disclosure further provides a touch screen which may include the color filter substrate shown in FIG. 2 or FIG. 3.

With the touch screen according to the embodiment of the present disclosure, since the surface of the TSP pattern provided on a side of the transparent substrate of the color filter substrate is formed with the plurality of concave curved faces, when a light emitted from a backlight source passes through the TSP pattern on the color filter substrate, the plurality of concave curved faces can refract the light towards different directions, such that an intensity of the light after passing through the TSP pattern may be weakened, and difference between refraction of the light emitted from the backlight source on the portion of the color filter substrate where the TSP pattern is provided and refraction of the light emitted from the backlight source on the portion of the color filter substrate where no TSP pattern is provided can be reduced. Furthermore, when the light impinges on the display side of the color filter substrate, the plurality of concave curved faces can scatter the light towards different directions, such that the intensity of the light which has been reflected by the color filter substrate may be weakened, and stripes present on the surface of the color filter substrate during displaying of images may be reduced and displaying effects may be improved.

The embodiment of the present disclosure further provides a display device which may include a touch screen including the color filter substrate shown in FIG. 2 or FIG. 3. In a specific embodiment, the display device may be any device that can provide a display function, such as a liquid crystal panel, an OLED panel, a cellphone, a panel computer, a displayer, a notebook computer, a navigator and the likes.

With the display device according to the embodiment of the present disclosure, since the surface of the TSP pattern provided on a side of the transparent substrate of the color filter substrate is formed with the plurality of concave curved faces, when a light emitted from a backlight source passes through the TSP pattern on the color filter substrate, the plurality of concave curved faces can refract the light towards different directions, such that an intensity of the light after passing through the TSP pattern may be weakened, and difference between refraction of the light emitted from the backlight source on the portion of the color filter substrate where the TSP pattern is provided and refraction of the light emitted from the backlight source on the portion of the color filter substrate where no TSP pattern is provided can be reduced. Furthermore, when the light impinges on the display side of the color filter substrate, the plurality of concave curved faces can scatter the light towards different directions, such that the intensity of the light which has been reflected by the color filter substrate may be weakened, and stripes present on the surface of the color filter substrate during displaying of images may be reduced and displaying effects may be improved.

All of optional technical solutions described above may be combined in any suitable manner to form optional embodiments of the present disclosure. The detailed explanation is omitted herein.

It should be noted that the embodiments of the present disclosure are exemplary and illustrative and are not intended to limit the present disclosure. Various modifications, equivalents and variations of the above embodiments may be made without departing from the scope and spirit of the disclosure. Thus, these modifications, equivalents and variations should fall within the scope of the present invention.

What is claimed is:
1. A color filter substrate, comprising:
 a transparent substrate; and
 a touch screen panel pattern provided on a side of the transparent substrate, a surface of the touch screen panel pattern being provided with a plurality of concave curved faces, wherein the plurality of concave curved faces comprise first concave curved faces and second concave curved faces, and wherein the touch screen panel pattern comprises a plurality of touch screen panel wires, and an upper surface of each of the plurality of touch screen panel wires is formed with a plurality of the first concave curved faces arranged in an array, and side surfaces of each of the plurality of touch screen panel wires are formed with the second concave curved faces.

2. The color filter substrate of claim 1, wherein an opening of the first concave curved face is in a circular shape.

3. The color filter substrate of claim 2, wherein the color filter substrate further comprises a color resister layer provided on the other side of the transparent substrate, and the color resister layer comprises color pixels and black matrix disposed between each two adjacent color pixels.

4. The color filter substrate of claim 1, wherein the color filter substrate further comprises a color resister layer provided on the other side of the transparent substrate, and the color resister layer comprises color pixels and black matrix disposed between each two adjacent color pixels.

5. A touch screen, comprising the color filter substrate according to claim 1.

6. A display device, comprising the touch screen according to claim 5.

7. The touch screen of claim 5, wherein an opening of the first concave curved face is in a circular shape.

8. The touch screen of claim 5, wherein the color filter substrate further comprises a color resister layer provided on the other side of the transparent substrate, and the color resister layer comprises color pixels and black matrix disposed between each two adjacent color pixels.

9. The color filter substrate of claim 1, wherein the color filter substrate further comprises a color resister layer provided on the other side of the transparent substrate, and the color resister layer comprises color pixels and black matrix disposed between each two adjacent color pixels.

10. A method of manufacturing a color filter substrate, comprising the steps of:
   forming a touch screen panel pattern on a side of a transparent substrate, a surface of the touch screen panel pattern being formed with a plurality of concave curved faces,
   wherein the plurality of concave curved faces comprise first concave curved faces and second concave curved faces,
   wherein the step of forming a touch screen panel pattern on a side of a transparent substrate comprises:
   forming an Indium Tin Oxide thin film on the side of the transparent substrate;
   forming an Indium Tin Oxide pattern comprising the first concave curved faces arranged in an array by the first patterning process; and
   forming the touch screen panel pattern comprising a plurality of touch screen panel wires by a second patterning process, an upper surface of each of the plurality of touch screen panel wires being formed with a plurality of the first concave curved faces arranged in the array, and side surfaces of each of the plurality of touch screen wires being formed with the second concave curved faces.

11. The method of claim 10, wherein photoresist used in in the first patterning process and photoresist used in the second patterning process both are negative.

12. The method of claim 11, wherein the method of manufacturing the color filter substrate further comprises:
   forming a color resist layer on the other side of the transparent substrate, the color resist layer comprising color pixels and black matrix disposed between each two adjacent color pixels.

13. The method of claim 10, wherein an opening of the first concave curved face is in a circle shape, and in a case that a thickness of the Iridium Tin Oxide thin film is in a range of 1000-3000 Å, a diameter of the circle is in a range of 200-600 Å, and a maximum depth of the first concave curved face is in a range of 100-300 Å.

14. The method of claim 13, wherein the method of manufacturing the color filter substrate further comprises:
   forming a color resist layer on the other side of the transparent substrate, the color resist layer comprising color pixels and black matrix disposed between each two adjacent color pixels.

15. The method of claim 10, wherein the method of manufacturing the color filter substrate further comprises:
   forming a color resist layer on the other side of the transparent substrate, the color resist layer comprising color pixels and black matrix disposed between each two adjacent color pixels.

16. The method of claim 10, wherein the method of manufacturing the color filter substrate further comprises:
   forming a color resist layer on the other side of the transparent substrate, the color resist layer comprising color pixels and black matrix disposed between each two adjacent color pixels.

* * * * *